Patented Jan. 13, 1931

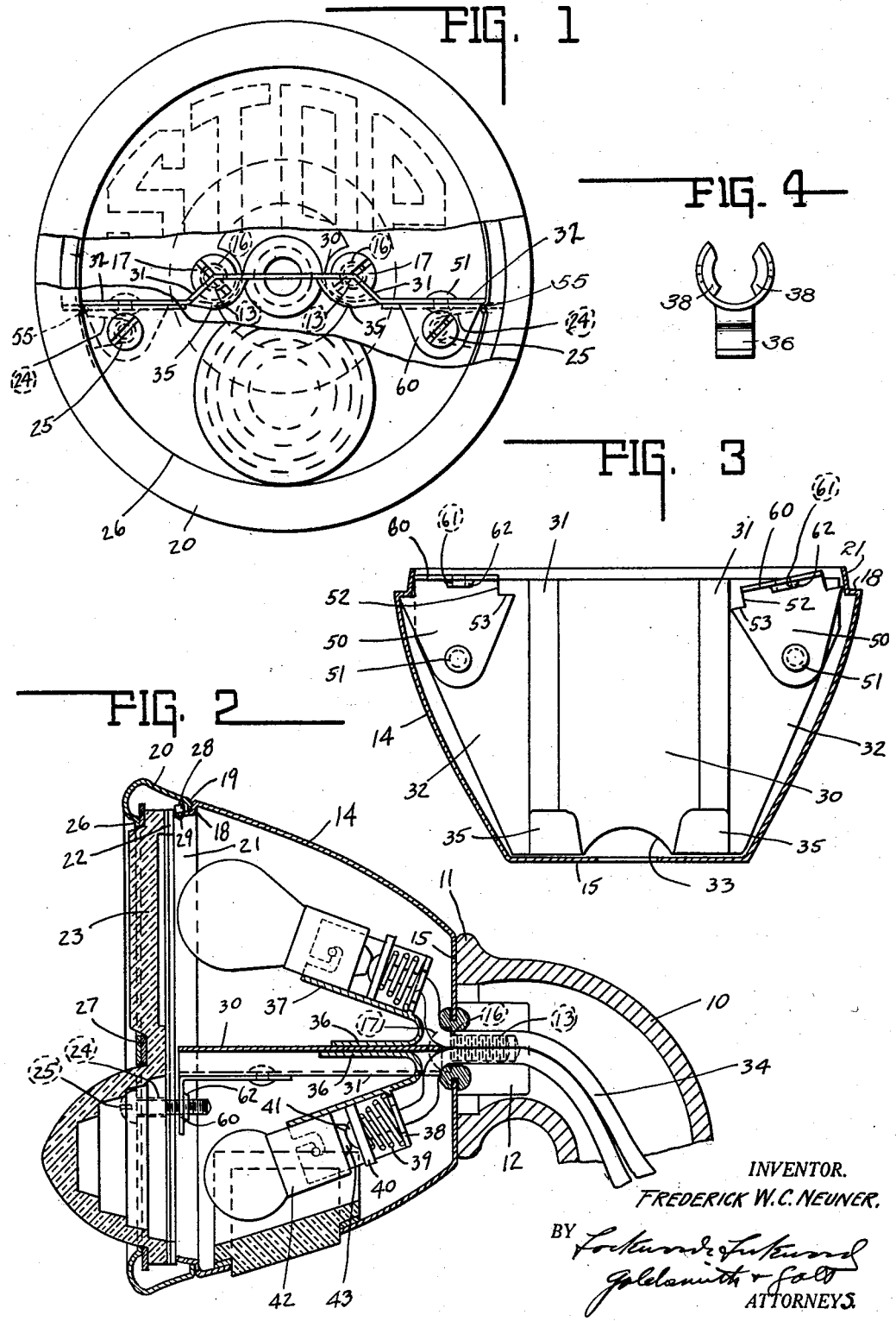

1,789,152

UNITED STATES PATENT OFFICE

FREDERICK W. C. NEUNER, OF CONNERSVILLE, INDIANA, ASSIGNOR TO INDIANA LAMP CORPORATION, OF CONNERSVILLE, INDIANA

MULTIPLE-COMPARTMENT LAMP

Application filed May 13, 1929. Serial No. 362,585.

This invention relates to a multiple compartment lamp, and particularly to the construction and anchorage of the several parts.

The chief object of the invention is to secure the partition of such a lamp to the casing without the aid of rivets or screws and yet retain the partition in predetermined position and secure it to the casing so that the rim can be secured in closure-retaining position by being secured thereto.

One feature of the invention consists in the anchorage of the partition by a pivoted lock.

A second feature of the invention consists in the formation of the pivoted lock with an extension adapted to be associated with the usual means heretofore employed for securing the rim to the partition.

A third feature of the invention consists in forming the anchorage previously indicated of such formation that a pair of them may be interchangeably used for either right or left hand mounting if desired.

The full nature of the invention will be understood from the accompanying drawings and the following descriptions and claims.

In the drawings, Fig. 1 is a front view of the multiple compartment lamp commonly known as a stop and tail lamp. Fig. 2 is a longitudinal central sectional view through the same. Fig. 3 is a transverse sectional view taken slightly below the plane of the partition, the rim and closure being omitted, the anchorages being shown in latching and released positions.

Fig. 4 is a front view of the bulb receiving socket.

In the drawings 10 includes a tubular mounting which has an annular flange 11 provided with two inward extensions 12, each apertured and tapped as at 13 for bolt reception.

The casing 14 has a back portion 15 that lies against the end of the tubular support and the casing is provided with a pair of apertures 16 which register with the threaded openings 13 and a pair of bolts 17 rigidly anchor the lamp casing 14 to the support 10.

The forward end of the casing terminates in an annular, inwardly-directed flange 18 that forms a stop for the inwardly-directed portion 19 of the rim 20. The inwardly-directed flange 18 includes a forward extension 21 which bears against suitable gasket means 22 interposed between the end of said flange 21 and a closure 23. Closure 23 at each side and slightly below the center is notched as at 24 to permit the reception or free passage of the rim and closure mounting screw bolts 25. The inner and forward end 26 of the rim bears upon the closure and the closure is divided into two parts by the transverse partition 27 of the rim and the same is integral therewith. A lug 28 may be suitably secured as by riveting 29 to the flange 21 and serves as a stop or catch for the rim.

The casing is secured to the tubular support and the rim is secured to partition in turn secured to the casing. The foregoing or the equivalent thereof constitutes no part of the invention except in the association with the remainder hereinafter described.

The partition extends across the casing and from front to rear thereof forming two compartments in superposed relation relative to a horizontal plane. The partition includes a central portion 30, two oppositely, downwardly and outwardly-directed portions 31 and two offset parallel portions 32. The rear end of the partition is cut away as at 33 to permit the passage of the conductors 34 into the several compartments. The partition in its formation is struck or offset at the rear end as at 35 (compare Figs. 1 and 3) to provide clearance for the heads of the bolts 17. Said deformations serve as locating members for the partition. Suitably secured to the upper and lower faces of the central portion 30 are the strap portions 36 which have forward and angular extensions 37 which may be semi-tubular (see Fig. 4) and include the lateral extension 38 against which bears one end of the spring 39 and through which extends conductor member 34. The insulation washer 40 supports the terminal end 41 of the conductors 34 and bears against the other end of the spring. The lamp bulb 42 is detachably mounted in the socket formed by the semi-tubular portion 37 and the terminal 43 thereof is associated with terminal 41. Access to the sockets for lamp bulb replacement is had by removing the rim and closure.

The means for anchoring the partitions to the casing includes an anchoring mechanism at each side of the partition. The same comprises a triangular pivotally-mounted locking or latch member 50 pivoted as at 51 to said partition and having at each forward corner a locking notch 52 with a locking tongue 53 formed thereby. Since the locking member is provided at each corner with a notch and a tongue, the same locking member is adapted for right or left hand locking when mounted upon the right or left hand side of the casing respectively.

The partition is inserted in the open end of the casing, see Fig. 3. The inserted partition has its position partially determined by the heads of the bolts 17 and the bolt locating deformations 35. The tiltable latches 50 are then tilted from the position shown at the right of Fig. 3 to the position as shown in the left of said figure, thereby projecting the adjacent tongue 53 into the groove formed in the forward edge of the casing by the inwardly-directed flange 18. The partition is thus locked to the casing. To prevent rotation of the partition in the casing, the embossments 55 are provided in the flange 21. Upward and downward movement of the partition is prevented by the partition portions 35 engaging the bolt heads 17 or casing portions 55 respectively.

Each tiltable latch includes an angular extension 60 centrally apertured as at 61 and at the aperture thereof, a suitable collar or flange 62 is formed. Said aperture and the collar or flange is threaded for receiving the bolt 25. The rim is thus locked to the partition and a clamping or drawing-up action can be obtained between the rim and casing.

The invention claimed is:

1. In a lamp construction, the combination with a casing, a closure, a rim, and a partition in the casing forming a plurality of compartments therein, of means detachably securing the rim to the partition and the partition to the casing including a latch member pivoted to the partition and co-operating with a portion of the casing.

2. In a lamp construction, the combination with a casing member and a partition member in the casing member forming a plurality of compartments therein, of a latch pivoted to one of said members and co-operating with the other for securing the partition to the casing and including an extension provided with a fastening means, a closure for the casing member, a rim for the closure, and means for holding the rim against the closure and the latter on the casing including means co-operating with the fastening means on said extension.

3. In a lamp construction, the combination with a casing, a closure, a rim, and a partition in the casing forming a plurality of compartments therein, of means detachably securing the rim to the partition and the partition to the casing including a latch member pivoted to the partition and co-operatting with a portion of the casing, said latch having a tapered body portion apertured near its apex, a pair of symmetrically located shoulders at its wider end and a screw threaded portion extending at right angles to the same end between said shoulders.

4. A latch for the partition of a lamp housing having a tapered body portion apertured near its apex, a pair of symmetrically located shoulders at its wider end and a screw threaded portion extending at right angles to the same end between said shoulders.

5. In a multiple compartment lamp the combination of an open front rearwardly tapering casing having an apertured back, a pair of anchoring bolts having heads within the casing and bodies extending through said apertures, said casing having a pair of inwardly directed projections at the open end, a tapering partition in said casing having portions at the smaller end cooperating with the heads of said bolts and the larger end cooperating with the casing projections for locating it in the casing.

In witness whereof I have hereunto affixed my signature.

FREDERICK W. C. NEUNER.